(12) United States Patent
Takaeda et al.

(10) Patent No.: US 10,353,892 B2
(45) Date of Patent: Jul. 16, 2019

(54) MULTIDIMENSIONAL CORRELATED DATA EXTRACTING DEVICE AND MULTIDIMENSIONAL CORRELATED DATA EXTRACTING METHOD

(71) Applicant: toor Inc., Fukushima (JP)

(72) Inventors: Yoshio Takaeda, Fukushima (JP); Tetsuya Kanada, Fukushima (JP)

(73) Assignee: toor Inc., Fukushima (JP)

( * ) Notice: Subject to any disclaimer, the term of this patent is extended or adjusted under 35 U.S.C. 154(b) by 483 days.

(21) Appl. No.: 15/172,656

(22) Filed: Jun. 3, 2016

(65) Prior Publication Data

US 2016/0378810 A1    Dec. 29, 2016

(30) Foreign Application Priority Data

Jun. 25, 2015   (JP) ................................ 2015-127720

(51) Int. Cl.
    *G06F 16/951*      (2019.01)
    *G06F 16/245*      (2019.01)

(52) U.S. Cl.
    CPC ................................ *G06F 16/245* (2019.01)

(58) Field of Classification Search
None
See application file for complete search history.

(56) References Cited

U.S. PATENT DOCUMENTS

| 2003/0200191 | A1 | 10/2003 | Pao et al. |
| 2010/0153356 | A1 | 6/2010 | Nakamura et al. |
| 2011/0060738 | A1* | 3/2011 | Gates ................ G06F 17/30749 707/737 |
| 2014/0324752 | A1* | 10/2014 | Statnikov ................ G06F 17/18 706/46 |

FOREIGN PATENT DOCUMENTS

| JP | 2006507558 | 3/2006 |
| JP | 2012103841 | 5/2012 |
| WO | 2008/143116 A1 | 11/2008 |

OTHER PUBLICATIONS

Numao et at, "Data Mining for Distribution Industry", Journal of Japanese Society for Artificial Intelligence, vol. 12, No. 4, Jul. 1, 1997, pp. 528-538. (partial English translation).
Japanese Office Action dated Apr. 23, 2019 from corresponding Japanese Patent Application No. 2015-127720, 8 pages.

\* cited by examiner

*Primary Examiner* — Wilson Lee
(74) *Attorney, Agent, or Firm* — Ohlandt, Greeley, Ruggiero & Perle, L.L.P.

(57) ABSTRACT

A method of extracting subsets from the whole population of data configured by values of many elements in a case where the subsets have a correlation for a plurality of elements and finding out correlated elements. More specifically, the method comprises modeling data as a vector based on values of all the elements configuring individual data, and, in a multidimensional space in which all the data included in the population is plotted, extracting subsets each having a multidimensional correlation based on the densities of plots, and finding out featured elements having a correlation in the subsets.

19 Claims, 3 Drawing Sheets

MULTIDIMENSIONAL CORRELATED DATA EXTRACTING DEVICE AND MULTIDIMENSIONAL CORRELATED DATA EXTRACTING METHOD

BACKGROUND

1. Field of the Disclosure

The present disclosure relates to a multidimensional correlated data extracting device and a multidimensional correlated data extracting method.

2. Discussion of the Background Art

Multidimensional data is data configured by values of various elements. As a specific example thereof, there is "purchase data" having product names and quantities of customer's purchased products at one-time purchase, a shopping time, and the like as elements such as POS (registered trademark) data of a supermarket. Hereinafter, the data of such sources will be referred to as "original data".

In finding out a correlation of data, it is relatively easy to find out a positive correlation between two elements (two dimensions). For example, a service has been provided which searches for documents having close contents from among a large amount of documents (for example, see Patent Literature 1). Speaking of purchase data, there may be a positive correlation between beef steak meat and a potato.

However, there are many cases where a correlation between elements that cannot be assumed cannot be found. The reason for this is that, as long as a technique of repeatedly setting a hypothesis and verifying the hypothesis is used, generally, it is difficult to set hypotheses and verify the hypotheses covering all the possibilities due to temporal restrictions and the like. In other words, it can be stated that since it is difficult to set an "unexpected" hypothesis, it is difficult to acquire an "unexpected" finding. In terms of purchase data, even when there is a correlation between beef meat and a detergent, it is considered to be difficult to find out such a correlation. In addition, for a correlation among three (three dimensions) or more elements, there are a large number of combinations thereof, and the difficulty rapidly increases.

A purchase pattern in a supermarket will be described as an example. Even when there are relatively many customers of a specific combination of beef meat, a detergent and a shopping time, conventionally, it is almost impossible to find out the combination. Particularly, in the case of big data that has recently been a hot topic, generally, while a plurality of "tendencies" having various correlations are hidden therein, the amount of data is vast, and accordingly, it is further difficult to find out even a set having a correlation between two elements.

Meanwhile, when a set having multidimensional correlated elements and the correlated elements are determined, data to be analyzed and dimensions (=elements) of the analysis are largely refined, and accordingly, it is easy to make various and deep analyses therefrom. Thus, how to find a set having a multidimensional correlation and the correlated elements thereof in an easy manner may be regarded as the most urgent task for a big data analysis.

CITATION LIST

Patent Literature

Patent Literature 1: WO 2008/143116 A

SUMMARY

In order to solve the problems described above, an object of the present disclosure is to enable finding out a set having multidimensional correlated elements and the correlated elements.

Solution to Problem

A multidimensional correlated data extracting device according to the present disclosure includes:

a similarity indexing function acquiring a similarity index representing a degree of similarity among multidimensional data in a multidimensional space for the multidimensional data configured by values of many elements; and a subset extracting function extracting multidimensional data included in a subset formed by multidimensional data having a correlation by using the similarity index.

The multidimensional correlated data extracting device according to the present invention may further include a dimension extracting function extracting a featured dimension having a strong correlation by acquiring a correlation index representing a degree of a variation of a difference between values of multidimensional data for the multidimensional data included in the subset for each dimension and comparing magnitudes of the correlation indexes with each other.

Here, the correlation index may be a variance value of the multidimensional data.

In addition, a featured dimension representing function, for each featured dimension having a strong correlation extracted according to the dimension extracting function, representing strength of the correlation may be further included.

Furthermore, a similarity index adjusting function weighting the similarity index for each of the featured dimensions based on the correlation index may be further included.

The multidimensional correlated data extracting device according to the present disclosure may further include a map generating function generating a map of multidimensional data by plotting the multidimensional data based on the similarity index.

The multidimensional correlated data extracting device according to the present disclosure may further include a data converting function converting original data configured by values of many elements into the multidimensional data.

A multidimensional correlated data extracting method using a multidimensional correlated data extracting device according to the present disclosure, includes:

a similarity indexing step of acquiring a similarity index representing a degree of similarity among multidimensional data in a multidimensional space for the multidimensional data configured by values of many elements; and a subset extracting step of extracting a subset of multidimensional data having a correlation by using the similarity index.

In addition, the disclosure described above can be combined together whenever possible.

Advantageous Effects of Invention

According to the present disclosure, a subset having multidimensional correlated elements and the correlated elements can be found out from among original data.

DETAILED DESCRIPTION OF THE PREFERRED EMBODIMENT

Hereinafter, embodiments of the present disclosure will be described in detail with reference to the drawings. However, the present disclosure is not limited to the embodiments described below. Such embodiments are merely examples, and the present disclosure may be performed in a form acquired by performing various changes and modifications based on the knowledge of a person skilled in the art. In the specification and the drawings, like reference numerals denote like constituent elements.

Embodiment 1

Figure 1:
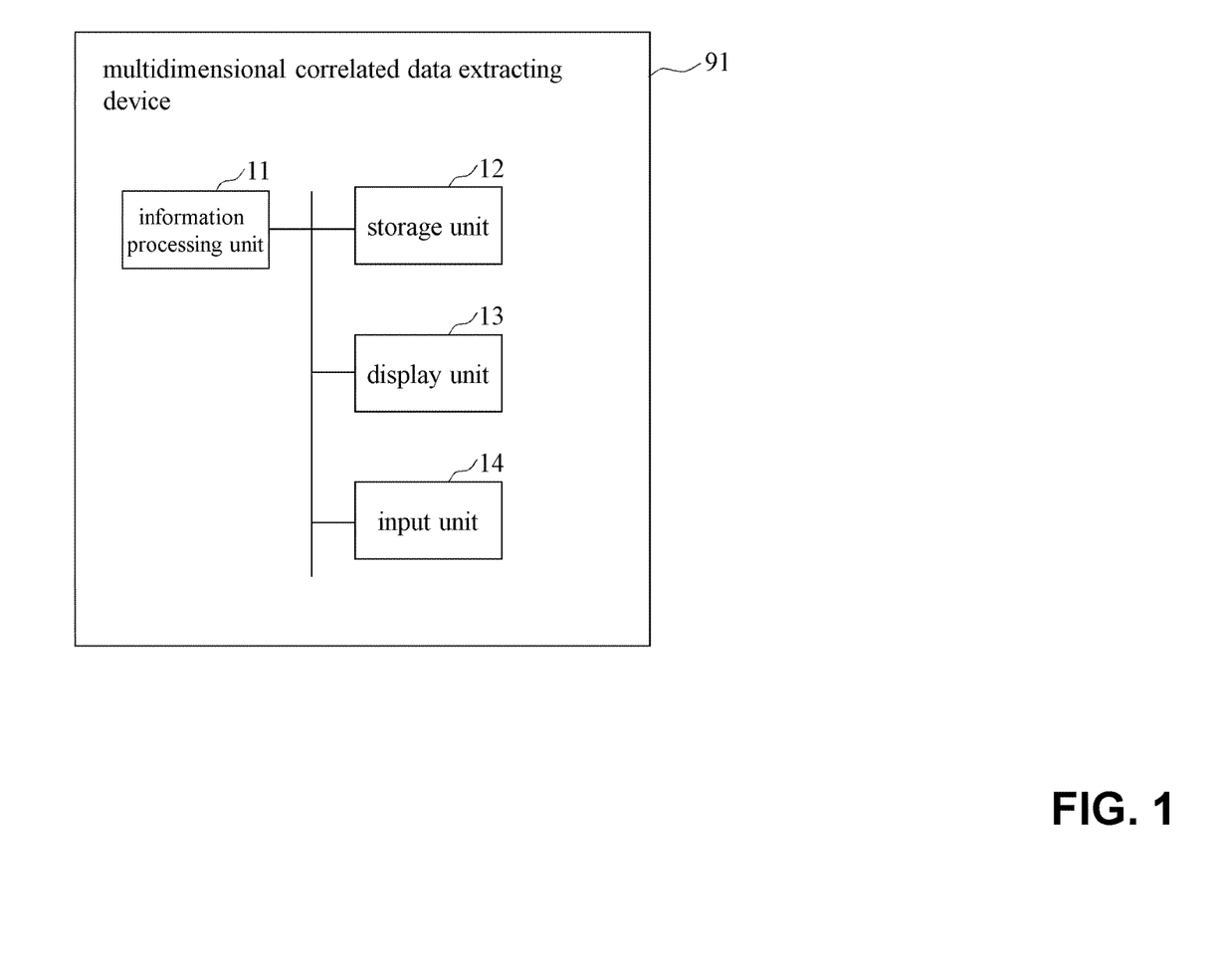
FIG. 1 illustrates an example of a multidimensional correlated data extracting device according to an embodiment of the present disclosure.

FIG. 1 illustrates an example of a multidimensional correlated data extracting device according to this embodiment. The multidimensional correlated data extracting device 91 according to this embodiment, for example, is a computer and includes: an information processing unit 11; a storage unit 12; a display unit 13; and an input unit 14.

In the storage unit 12, a population of original data configured by values of many elements is stored. In this embodiment, "multidimensional data" may be referred to as "data".

The information processing unit 11, for example, is a central processing unit (CPU). The information processing unit 11 has a data converting function, a similarity indexing function, a subset extracting function, and a map generating function.

The data converting function enables original data to be converted into multidimensional data and to be stored in the storage unit 12. The multidimensional data, for example, is vector data. In such a case, one piece of data included in a population of the original data will be denoted as $X_i=(x_{i1}, x_{i2}, \ldots x_{iN})$. Here, "i" represents i-th data. In addition, $x_{ik}$ (here, k=1, 2, ..., N) is a value of a k-th element. In a vector denotation, elements can be regarded as dimensions. N is the number of dimensions.

In the case of purchase data of a supermarket as an example, Xi corresponds to an i-th receipt, k corresponds to a product such as a detergent, $x_{ik}$ corresponds to a purchase amount thereof. It is apparent that other various models are present.

When dimension values are directly used, there are cases where the values are irregular depending on the elements. For example, the number of purchased detergents is about one or two, the amount of purchased beef meat is about 100 g. Thus, since there is a possibility that a specific dimension has great influence on the calculation of the degree of similarity performed on a later stage, it is preferable to perform some sort of normalization (for example, normalization is performed using an average value for each dimension) or to perform appropriate weighting.

For example, in the data converting function, it is preferable that, after normalization, weighting, or the like of each element value of the original data is performed as is necessary, the original data is converted into multidimensional vector data. More specifically, all the elements are taken as "dimensions", and, by using the value of each element configuring one piece of data as the value of a corresponding dimension, after normalization, weighting, or the like is performed as is necessary, a data vector Xi is generated for each piece of data. In addition, in a case where a variation component is of significance, by performing an offset correction of subtracting an average value of the multi-dimensions from a value of each dimension, the variation component may be set as a dimension value. Here, N is the number of dimensions.

[Numerical Expression 1]

$$Xi=(x_{i1}, x_{i2}, \ldots, x_{iN}) \quad \text{(Equation 1)}$$

In the similarity indexing function, a similarity index representing the degree of similarity among multidimensional data in a multidimensional space is acquired. More specifically, the degree of similarity between data Xi and data Xj can be represented using a numerical value as a distance between both data vectors. As the distance, in addition to an actual distance $D_{ij}$ represented using Equation (2), an inner product, an outer product, or any other that is equivalent thereto may be used. In this way, the similarity indexing function forms the degree of similarity among multidimensional data as an index.

The subset extracting function is a function for extracting subsets each formed by multidimensional data having a correlation and dimensions having a correlation based on the similarity index. In a case where each element (dimension) has a random value, in a multidimensional space, data is randomly arranged, and any "structure" is not formed. On the other hand, in a certain subset, in a case where there is a positive correlation among a plurality of elements, data included in the subset is closely located. In other words, in the multidimensional space, an area A11 having a high density is formed. The reason for this is that the distance $D_{ij}$ between the data $X_i$ and the data $X_j$ in the multidimensional space is represented using Equation (2), and accordingly, in a case where there is a positive correlation between some dimensions, values and variation of $(x_{ik}-x_{jk})^2$ of those dimensions is small.

[Numerical Expression 2]

$$D_{ij}=\sqrt{\Sigma_k(x_{ik}-x_{jk})^2} \quad \text{(Equation 2)}$$

In the subset extracting function, generally, a clustering method is used for extracting subsets. A method in which the number of clusters is designated, a method in which clustering is performed until a total number of pieces of data and clusters arrive at a predetermined percentage of the number of pieces of data at the beginning, and the like are considered. As long as an area having a high data density can be extracted, the method is not limited to the clustering method.

The extraction of subsets can be further easily realized by a map generating function. In the map generating function, a map of multidimensional data is generated by plotting the multidimensional data based on similarity indexes among data. For example, multidimensional data is arranged on a plane (or a spherical surface or the like can be used) such that close data is positioned to be close as possibly as can, whereby a map of the whole population of data is generated. The display unit 13 displays the map acquired by plotting the multidimensional data on the plane. In this way, by using the density of plots on the map, the density of data in the multidimensional space is two-dimensionally displayed, and subsets having a positive multidimensional correlation can be visualized in the form of a high-density area on the map.

Figure 2:
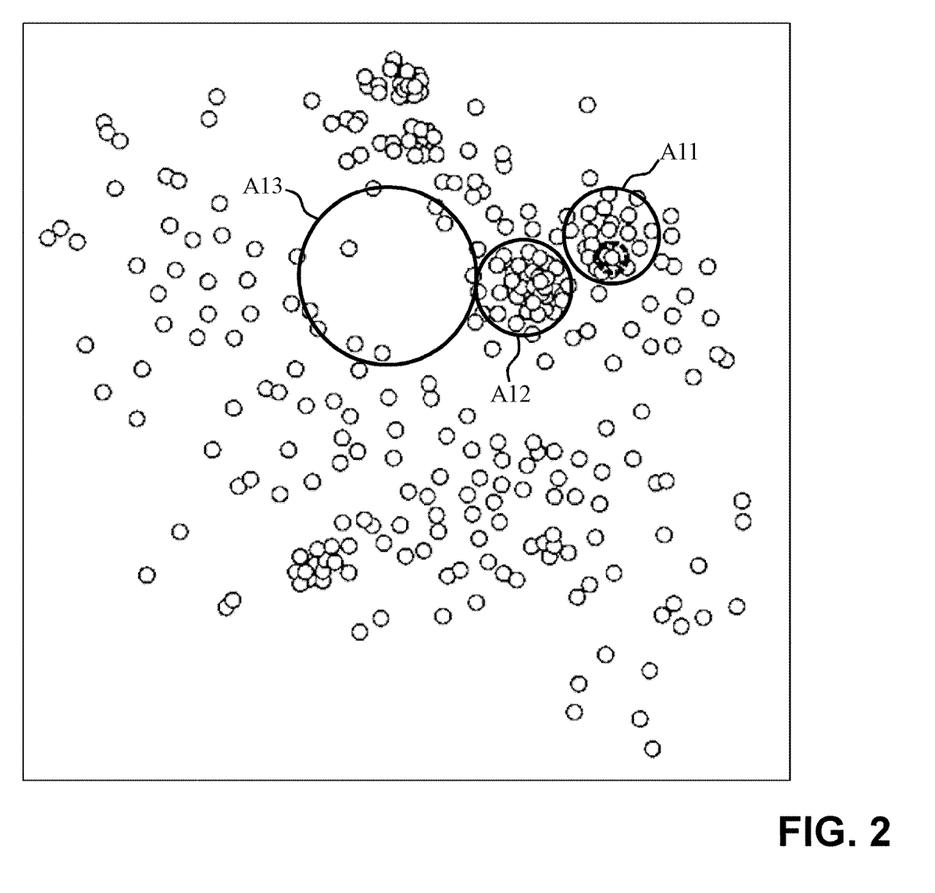
FIG. 2 illustrates an example of a map in which multidimensional data is plotted in a multidimensional space.

FIG. 2 illustrates an example of a map in which multidimensional data is plotted on a plain. In a case where there is no correlation among data, the data is randomly located, and the density is uniform. On the contrary, in a case where the density is not uniform, and variations in the density appear, a multidimensional correlation is present in an area having a high density. It can be stated that subsets having a multidimensional correlation can be visualized. When the map is generated, it is easy to extract a portion in which the plot density is high. In addition, a range to be extracted can be set based on the plot density. By using the clustering method, it is difficult to realize such flexibility.

Then, a method for finding out a negative correlation will be described. A distance between data having a negative correlation is increased. In other words, in the map illustrated in FIG. 2, like an area A13, such a negative correlation corresponds to an area having a low density. In a case where the density is low, only a small number of pieces of data are present, and it is difficult to directly use the technique used in the case of a positive correlation.

Thus, by substituting the original distance with a new distance that is a reciprocal of the original distance, a negative correlation is seen to be a positive correlation and can be analyzed similar to the case of a positive correlation. In other words, by substituting the original distance $D_{ij}$ with a new distance $D_{ij}'=1/D_{ij}$, the new distance $D_{ij}'$ decreases as data has a long distance $D_{ij}$, and accordingly, as the negative correlation is higher, the data can be handled as data having a high degree of similarity. As a result, by using a method such as the clustering method or the like, subsets each having a negative correlated element can be extracted, and elements having a negative correlation can be extracted as well.

In this way, other various methods for inverting the distance may be considered. For example, a method in which a value acquired by subtracting an actual distance from a maximum value of distance among data is set as a new distance or the like may be considered.

Embodiment 2

In a multidimensional space, in a case where data of an area having a high plot density or an area having a low plot density area is extracted, a correlation is present in a plurality of dimensions of the data. The dimension having such a correlation is defined as a featured dimension or a featured element.

The information processing unit 11 further has a dimension extracting function for extracting featured dimensions. In the dimension extracting function, for multidimensional data having multidimensional correlated elements, for each dimension, a correlation index representing a variation degree of a difference between values of multidimensional data is acquired, and, by comparing the magnitudes of the correlation indexes with each other, a featured dimension having a strong correlation is extracted.

In addition, the information processing unit 11 further has a featured dimension representing function for representing the strength of a correlation extracted according to the dimension extracting function. For example, in the featured dimension representing function, the strength of a correlation of an extracted dimension having a strong correlation is represented as a numerical value. For example, the featured dimension representing function represents the strength of a correlation of an extracted dimension having a strong correlation as a graph.

In the dimension extracting function, as a method for extracting a featured dimension, several specific methods may be considered. First, an example of the dimension extracting function of a case where a positive correlation is present will be described. As one method for extracting data vectors included in an area having a high density and acquiring multidimensional positive correlated elements in subsets thereof, the following method may be presented as an example.

A multidimensional correlation is taken, in other words, one of areas each having a high density on a map is set as a subset P, and the complementary set Q thereof in a population of data is set. In the subset P, in order for a dimension k to be a dimension that greatly contributes to a positive correlation within the subset P, the following two conditions are necessary.

Condition 1: A distance between pieces of data within the subset P is sufficiently smaller than a distance between pieces of data of the subset P and the complementary set Q.

A difference between dimension values of the dimension k between pieces of data within the subset P is small, and a difference between dimension values of the dimension k between pieces of data of the subset P and the complementary set Q is sufficiently larger than the above-described difference.

In other words, a variance value $\sigma^P_k$ of the dimension k within the subset P is sufficiently smaller than a variance value $\sigma^{P-Q}_k$ between the subset P and the complementary set Q.

Condition 2: A distance between pieces of data of the subset P and the complementary set Q is equal to or larger than an average of distances between pieces of data in the whole population.

A difference between dimension values of the dimension k between pieces of data within the subset P is on the same level as or equal to or larger than a difference between dimension values of all the dimensions between pieces of data of the whole population.

In other words, a variance $\sigma^{P-Q}_k$ of dimension values of the dimension k between pieces of data of the subset P and the complementary set Q needs to be equal to or larger than the variance $\sigma_t$ of dimension values of all the dimensions of the whole population.

For data (i, j=1 to Mp) within the subset P, a variance $\sigma^P_k$ that can be taken by the value of $x_{ik}-x_{jk}$ of the dimension k is represented in the following Equation.

(Numerical Expression 3)

$$\sigma^P_k = \Sigma_{i,j}(x_{ik}-x_{jk})^2/Mp^2 \qquad \text{(Equation 3)}$$

In addition, a variance $\sigma^{P-Q}_k$ of the dimension k between pieces of data of the subset P and the complementary set Q is represented in the following equation.

(Numerical Expression 4)

$$\sigma^{P-Q}_k = \Sigma_{i,j}(x_{ik}-x_{jk})^2/Mp(Mt-Mp) \qquad \text{(Equation 4)}$$

Here, Mt is the number of data of the whole population, and i=1 to Mp, j=(Mp+1) to Mt An average variance $\sigma_t$ of all the dimensions of the whole population is represented as below with i, j=1 to Mt.

(Numerical Expression 5)

$$\sigma_t = \Sigma_k\{\Sigma_{i,j}(x_{ik}-x_{jk})^2Mt^2\}/N \qquad \text{(Equation 5)}$$

Here, N is the number of dimensions.

Conditions 1 and 2 described above are represented in the following two equations.

(Numerical Expression 6)

$$\sigma^P_k/\sigma^{P-Q}_k \ll 1 \qquad \text{(Equation 6-1)}$$

$$\sigma_t/\sigma^{P-Q}_k < \text{ or to } 1 \qquad \text{(Equation 6-2)}$$

Thus, as one example of the "correlation index" of the dimension k used for determining both the conditions, the following equation is defined.

(Numerical Expression 7)

$$C_k = \sigma^P_k * \sigma_t / \sigma^{P-Q}_k{}^2 \quad \text{(Equation 7)}.$$

It can be stated that, as $C_k$ is further smaller than "1", the multidimensional correlation of the dimension k is strong. Accordingly, it can be stated that a dimension having a small correlation index $C_k$ is a featured dimension.

To the contrary, in a case where a negative correlation is present, it can be stated that, as $C_k$ is further larger than "1", the dimension k has a stronger negative multidimensional correlation. Accordingly, it can be stated that a dimension having a large correlation index $C_k$ is a featured dimension of the case of a negative correlation.

In the dimension extracting function, in a case where a positive correlation is handled, dimensions having small $C_k$ are extracted in order of smallest to largest $C_k$. In the featured dimension representing function, elements of the original data corresponding to the order of smallest to largest $C_k$ and $C_k$ are displayed, and graphs thereof are represented. At this time, a numerical value of $C_k$ may be displayed as it is, or a reciprocal thereof may be displayed. The strength of the correlation, for example, may be displayed using levels of five steps or the like.

The correlation index $C_k$ may be reflected on weighting of each dimension. For example, the information processing unit 11 further has a similarity index adjusting function. In the similarity index adjusting function, based on the correlation index, for each featured dimension, weighting is performed for a similarity index.

The distance $D_{ij}$ between pieces of data represented using (Equation 2) that has already been defined is weighted as in (Equation 8-1) in the case of a positive correlation and is weighted as in (Equation 8-2) in the case of a negative correlation.

[Numerical Expression 8]

[Numerical Expression 8]

$$D_{ij} = \sqrt{\Sigma_k \frac{(x_{ik} - x_{jk})^2}{C_k}} \quad \text{(Equation 8-1)}$$

$$D_{ij} = \sqrt{\Sigma_k C_k (x_{ik} - x_{jk})^2} \quad \text{(Equation 8-2)}$$

According to such weighting, a distance of a dimension having a strong multidimensional correlation is emphasized, and a density distribution on the map is emphasized, whereby the structure is displayed more clearly. This method is effective also as an automatic weighting method.

More specifically, on a generated map, a range of subsets of which the structures are desired to be displayed more clearly is determined on a display screen. A correlation index $C_k$ is automatically calculated from data of the range, new similarity indexes are automatically recalculated based on Equations 8-1 and 8-2 by using the correlation index, and a map is automatically generated again by using the new similarity index acquired as a result thereof. As a result, a new map on which the contour of the subset is displayed more clearly is automatically generated.

Embodiment 3

In this embodiment, multidimensional data is purchase data for each payment event, an example in which a correlation between a product and a payment event is analyzed will be described. In this embodiment, dimensions (elements) and dimension values thereof, for example, are the number of onions, the weight (gram display or the like) of beef meat, the number of purchased detergents, and the like. In addition, as the purchase data, in addition to purchase contents, payment date and time, an ID of a customer, a register number, and the like are simultaneously recorded as metadata. In such a case, there are cases where the multidimensional data is formed by vector data of several thousands to several tens of thousands of dimensions depending on the classification of products.

The information processing unit 11 generates a data vector having quantities of products included in one payment event (a content of a receipt that is generally received by a customer) as values of dimensions. At this time, there are also cases where the quantities are normalized or weighted. As methods used for the normalization, various methods including normalization using an average value, normalization using a maximum value, and the like may be considered. In addition, there are also cases where a vector value of a specific dimension is weighted depending on the purpose of an analysis.

Figure 3:
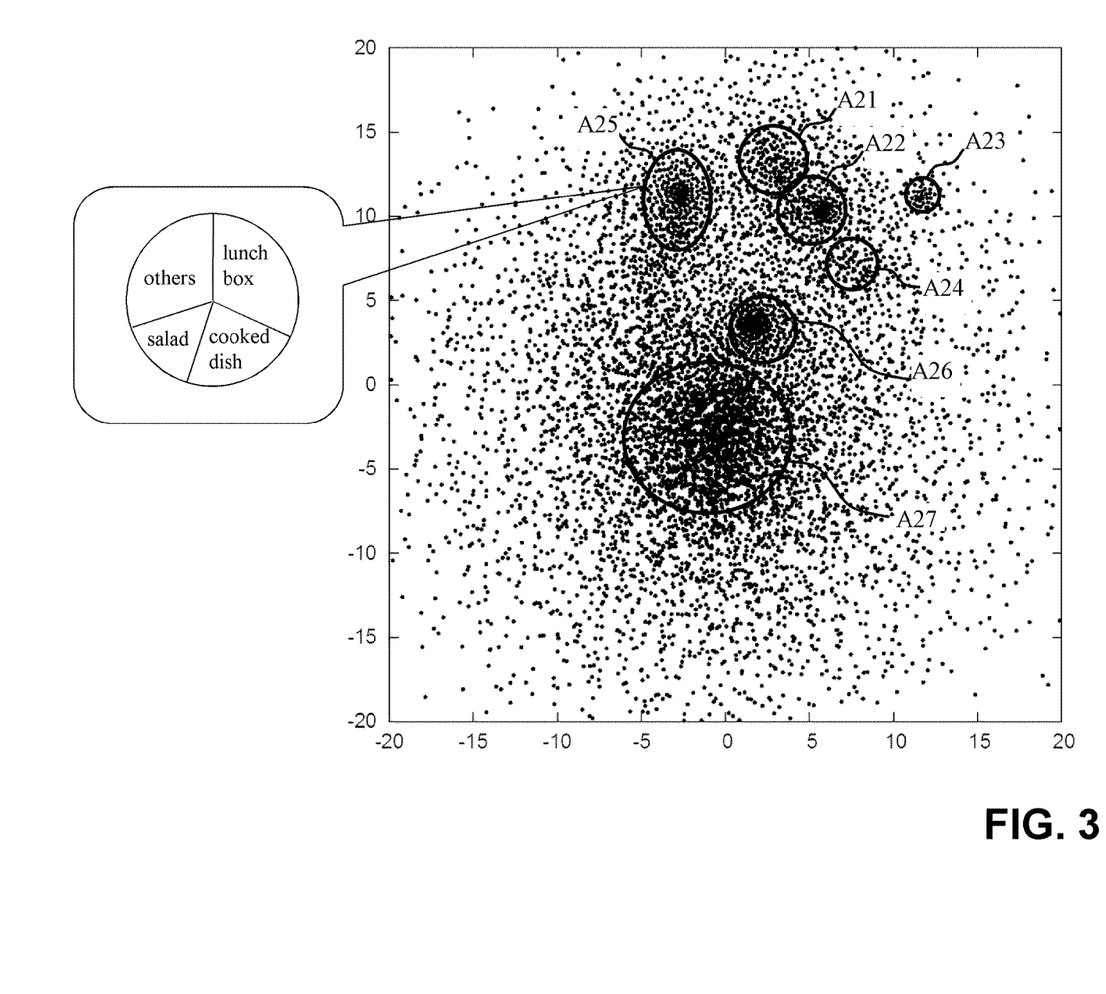
FIG. 3 illustrates an example of a map according to Embodiment 4.

The information processing unit 11 calculates the degree of similarity among data vectors, in other words, distances among vectors and plots all the data on a surface based on the distance. FIG. 3 illustrates an example of a map according to this embodiment. Generally, a plurality of subsets such as areas A21 to A27 having high densities appear. For each of the subsets, a product (featured product) having a strong positive correlation can be found out. In addition, a tendency of purchase can be read therefrom. Furthermore, by comparing featured products of the subset P with metadata, a tendency of a purchaser can be read therefrom.

For example, the areas A21, A22, and A24 have a correlation in which curry and cooked materials are mainly purchased on a daily basis. Accordingly, a payment event made by a purchaser of a working couple can be assumed, and it can be checked from metadata. The area A23 has a correlation that yakitori is main, and the purchase is made during daytime. Similarly, it can be understood that the payment event is made by a purchaser of an aged man. The area A25 is a customer group mainly purchasing ready-made products such as a lunch box and a cooked dish, and a single-person household can be assumed. The area A26 has a correlation in which the store is visited on bargain days and holidays, a broad range of products mainly including milk, eggs, and bean curd is purchased, and a plastic bag is not bought. Similarly, this can be understood as a payment event made by purchasers of housewives, and, simultaneously, it can be also assumed that the purchasers are sensitive to environment problems. The area A27 is a payment event made by a maximum number of purchasers. The area A27 has a correlation in which the store is visited for purchases every day, a broad range of products mainly including milk, eggs, and bean curd is purchased, and a paper bag is purchased. The number of customers is large, and a general housewife class can be easily assumed.

In the featured dimension representing function, a featured dimension may be displayed on the display unit 13. For example, in the featured dimension representing function, as illustrated in FIG. 3, a lunch box, a cooked dish, and salad that are featured dimensions of the area A25 may be formed as a graph and displayed on the display unit 13.

Embodiment 4

In this embodiment, multidimensional data is purchase data for each product. A dimension is a customer of an individual person, and a dimension value is a purchased quantity of the product by the customer within a predetermined period. In addition, as customer's purchase data, in addition to a purchase content, an ID of a product, purchase date and time, a resister name, and the like are simultaneously recorded as metadata. In such a case, generally, multidimensional data is vector data of several thousands to several tens of dimensions in correspondence with the number of customers.

The information processing unit 11 generates a data vector having a purchased quantity of each customer during a predetermined period as a dimension value for each product. The information processing unit 11, similar to Embodiment 3, plots all the data on a surface.

For a subset of an area having a high density, products included therein, and featured customers (customers purchasing them frequently) can be extracted. In other words, a customer list of customers considered to purchase a plurality of products as a set can be extracted. Generally, a plurality of subsets appear, simultaneously, a plurality of tendencies can be found out.

Embodiment 5

For example, like cancer, while there is a disease depending on a gene, generally, a plurality of genes are considered to be involved in a disease, and it is stated that, when a combination thereof is clarified, it will greatly help the treatment of the disease including prevention thereof. However, it is stated that the number of human's genes is twenty some thousands. In addition, there are many cases where a plurality of displacements are present in the structure in one gene, and it is a very difficult operation to clarify a combination relating a specific disease.

Thus, in this embodiment, genetic data of each subject is converted into multidimensional data, and a correlation between a base sequence and a disease is analyzed. Base sequences including displacements thereof are set as dimensions. The number of dimensions, in principle, is a number that is larger than a total number of genes by a value corresponding to the displacements. However, since it is not realistic to read all the genes of a patient, it is realistic to limit the analysis to several hundreds of genes considered to have possibilities for the time being.

For a healthy person and a patient of a specific disease, target genes are read, and a value of a dimension of a corresponding gene is set to "1", and a dimension value of a non-corresponding gene is set to "0". Features of a disease or the like other than genes are metadata.

When possible, a map is generated according to the sequence of this patent by using genetic data of a total of 1000 or more including normal persons of 500 or more and patients of a specific disease, which is considered to have a large factor of genes, of 500 or more as a population. On the map, it can be expected that several areas having a plot density higher than the periphery appear. In each high-density area, a patient having several dimensions having a positive correlation, in other words, having several similar genes is included.

On the map, for example, when plots of 500 patients are displayed in red, and plots of 500 normal persons are displayed in blue, there is a plot area having a high density in which many red plots are present, in other words, the ratio of patients is high. In a case where the number of such areas is one, there is a high possibility that a combination of one set of genes is involved in the disease. In a case where there are a plurality of areas, there is a high possibility that a plurality of combinations of genes involved in the disease are present, and there is a high possibility that the characteristics of the disease are different for each of the combination of genes.

For each high-density area, from a gene set of involved genes and a variance value and a standard deviation of each dimension thereof, a correlation index of each of the genes included in the set can be extracted. Among the normal persons, a person who is plotted in such an area is considered to have a high possibility of having an occurrence of the disease in the future, and a preventive measure can be taken.

Embodiment 6

In this embodiment, an example will be described in which multidimensional data is program data, and a correlation between an audience rating and program participants is analyzed. In this embodiment, a dimension (element) includes information relating to the program participants. The information relating to program participants includes actors, producers, directors, screenwriters, and the like participating in a program such as a drama and a variety show, or the like of TV. As metadata of the program, a program name, a genre, an audience rating, broadcast date and time, and the like are considered.

The information processing unit 11 generates a data vector having all the participants participating in all the programs to be analyzed as dimensions. For a specific program, a program vector is generated with "1" set to a participant and "0" set to a non-participant.

The information processing unit 11 generates a map for each program represented as a data vector based on the degree of mutual similarity, in other words, a similarity index such as a distance between program vectors or the like. On the map, a low density/high density appears at a plot position of each program data in correspondence with the degree of similarity of program participants. An area having a high density is an area in which the participants are similar to each other. On this map, the colors of plots of programs are classified based on audience rating. For example, the colors are set such that blue is set to a program having a low audience rating, and blue=>green=>yellow=>orange=>red is set as the audience rating increases.

On the map, a first area in which the number of plots of red and orange having high audience rating is large, a second area in which the number of plots of red and orange having high audience rating is small, a third area in which plots having high audience rating and plots having low audience rating are present at an almost same rating, and a fourth area in which the number of plots of blue having a low audience rating is large, and the like appear. For each of the areas, featured participants are extracted.

In a case where an area is the first area, and the ratio of high audience rating is particularly high, the probability that a program in which featured participants of the area participate together has a high audience rating is very high. In a case where an area is the fourth area having a low audience rating, it represents that the probability that a program in which a combination of featured participants of the area participates fails is high. In a case where an area is the third area in which plots of red and plots of blue are half-and-half, for example, there is a possibility that a success or a failure is determined according to attributes such as a time period, day, and the like. For example, there is a possibility that the audience rating greatly changes for the same combination of participants according to weekday or weekend, golden time or a time period in the middle of the night, or the like using metadata.

Through such an analysis, a difference in the success probability according to a participant group having a high success probability, each element of metadata, and the like can be analyzed. Though such an analysis, not an analysis focusing on leading characters, but a case where a success or a failure of a program is determined according to a participant, an attribution factor and the like that are not considered can be analyzed.

INDUSTRIAL APPLICABILITY

The present disclosure can be applied to an information communication industry.

REFERENCE SIGNS LIST

11: Information processing unit
12: Storage unit
13: Display unit
14: Input unit
91: Multidimensional correlated data extracting device

What is claimed:

1. A multidimensional correlated data extracting device implemented on a computer comprising:
a central processing unit configured to perform operations of:
a similarity indexing function acquiring a similarity index representing a degree of similarity among multidimensional data in a multidimensional space for the multidimensional data configured by values of many elements;
a subset extracting function extracting multidimensional data included in a subset that forms an area having a high density in the multidimensional space by using the similarity index; and
a dimension extracting function extracting a featured dimension having a strong correlation in the multidimensional data included in the subset by acquiring a correlation index representing a degree of a variation of a difference between values of multidimensional data for each dimension and comparing magnitudes of the correlation indexes with each other for the multidimensional data included in the subset and multidimensional data included in a complementary set of the subset.

2. The multidimensional correlated data extracting device according to claim 1, wherein the correlation index is a variance value of the multidimensional data.

3. The multidimensional correlated data extracting device according to claim 1, further comprising a featured dimension representing function, for each featured dimension having a strong correlation extracted according to the dimension extracting function, representing strength of the correlation.

4. The multidimensional correlated data extracting device according to claim 1, further comprising a similarity index adjusting function weighting the similarity index for each of the featured dimensions based on the correlation index.

5. The multidimensional correlated data extracting device according to claim 1, further comprising a map generating function generating a map of multidimensional data by plotting the multidimensional data based on the similarity index.

6. The multidimensional correlated data extracting device according to claim 1, further comprising a data converting function converting original data configured by values of many elements into the multidimensional data.

7. A multidimensional correlated data extracting method comprising:
a similarity indexing step, performed by a central processing unit (CPU) of a computer, of acquiring a similarity index representing a degree of similarity among multidimensional data in a multidimensional space for the multidimensional data configured by values of many elements;
a subset extracting step, performed by the CPU, of extracting a subset that forms an area having a high density in the multidimensional space by using the similarity index; and
a dimension extracting step, performed by the CPU, of extracting a featured dimension having a strong correlation in the multidimensional data included in the subset by acquiring a correlation index representing a degree of a variation of a difference between values of multidimensional data for each dimension and comparing magnitudes of the correlation indexes with each other for the multidimensional data included in the subset and multidimensional data included in a complementary set of the subset.

8. The multidimensional correlated data extracting device according to claim 2, further comprising a featured dimension representing function, for each featured dimension having a strong correlation extracted according to the dimension extracting function, representing strength of the correlation.

9. The multidimensional correlated data extracting device according to claim 2, further comprising a similarity index adjusting function weighting the similarity index for each of the featured dimensions based on the correlation index.

10. The multidimensional correlated data extracting device according to claim 2, further comprising a map generating function generating a map of multidimensional data by plotting the multidimensional data based on the similarity index.

11. The multidimensional correlated data extracting device according to claim 3, further comprising a similarity index adjusting function weighting the similarity index for each of the featured dimensions based on the correlation index.

12. The multidimensional correlated data extracting device according to claim 3, further comprising a map generating function generating a map of multidimensional data by plotting the multidimensional data based on the similarity index.

13. The multidimensional correlated data extracting device according to claim 4, further comprising a map generating function generating a map of multidimensional data by plotting the multidimensional data based on the similarity index.

14. The multidimensional correlated data extracting device according to claim 1, further comprising a map generating function generating a map of multidimensional data by plotting the multidimensional data based on the similarity index.

15. The multidimensional correlated data extracting device according to claim 8, further comprising a similarity index adjusting function weighting the similarity index for each of the featured dimensions based on the correlation index.

16. The multidimensional correlated data extracting device according to claim 8, further comprising a map generating function generating a map of multidimensional data by plotting the multidimensional data based on the similarity index.

17. The multidimensional correlated data extracting device according to claim 8, further comprising a map generating function generating a map of multidimensional data by plotting the multidimensional data based on the similarity index.

18. The multidimensional correlated data extracting device according to claim 9, further comprising a map generating function generating a map of multidimensional data by plotting the multidimensional data based on the similarity index.

19. The multidimensional correlated data extracting device according to claim 11, further comprising a map generating function generating a map of multidimensional data by plotting the multidimensional data based on the similarity index.

* * * * *